Nov. 19, 1929.　　　　F. W. NITTEL　　　　1,736,166
MESH BRACELET
Filed Feb. 11, 1928
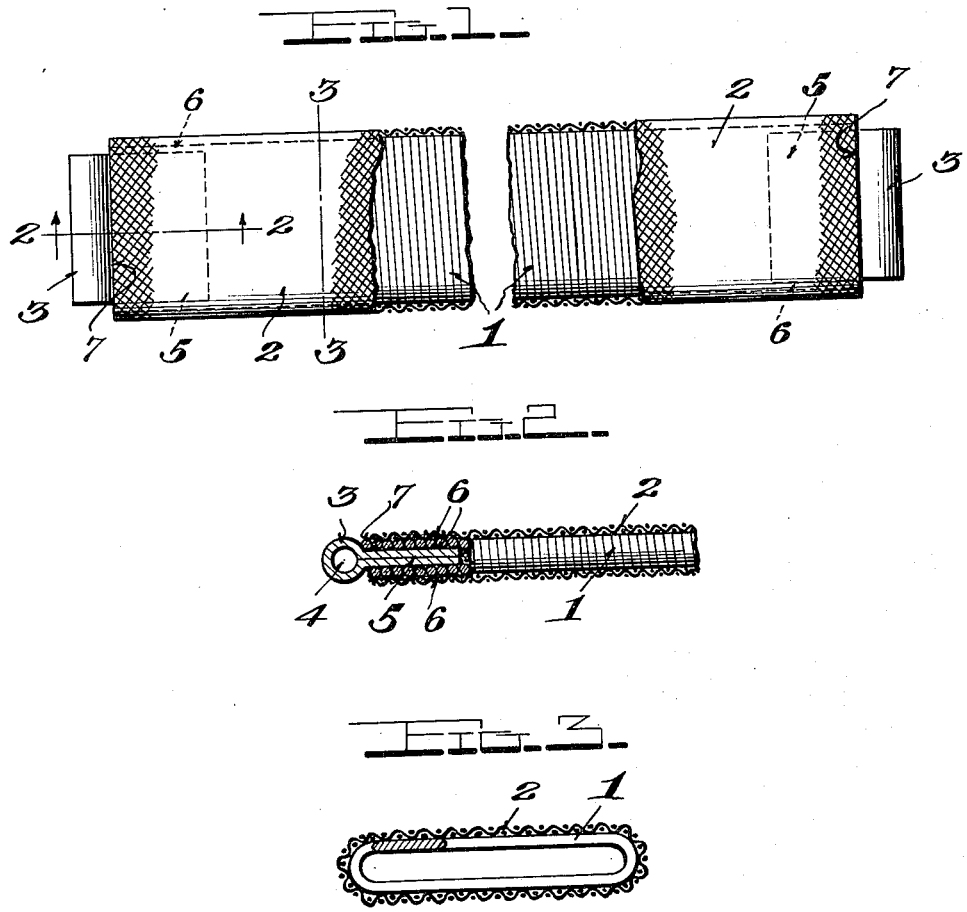
Inventor
Frederick W. Nittel
By Joseph A. Miller
Attorney Patented Nov. 19, 1929

1,736,166

UNITED STATES PATENT OFFICE

FREDERICK W. NITTEL, OF ATTLEBORO FALLS, MASSACHUSETTS, ASSIGNOR TO M S CO., OF ATTLEBORO, MASSACHUSETTS

MESH BRACELET

Application filed February 11, 1928. Serial No. 253,639.

This invention relates to improvements in mesh bracelets, and the primary object thereof is to provide a bracelet of this type in which seamless mesh is employed and which has a filler therein comprised of a spring which while flexible, is nevertheless form-retaining, thereby preventing any distortion of the mesh and holding the latter in a flat predetermined shape.

A further object of the invention is to provide a novel means for connecting the filler spring to the mesh fabric.

In the drawings:—

Figure 1 is a plan view partly broken away of the present invention, and

Figures 2 and 3 are sections on lines 2—2 and 3—3 of Fig. 1.

In proceeding in accordance with the present invention a filler spring 1 is employed which latter is of substantially rectangular cross section and which is formed so as to have the opposite sides of its helices or convolutions closely related to each other and adjacent sides of adjacent helices abutting, thereby to provide a firm and substantial filler for the external mesh fabric 2. The spring filler 1 is made of strong and stout wire which is coiled as depicted in Figure 1 of the drawings and receives attaching members 3 in each of its ends. Each attaching member 3 is composed of a piece of metal doubled upon itself intermediate its ends to form an eye 4 and having its ends in abutting relation as depicted at 5 thereby to form a shank for the connecting member. The shank is inserted in the ends of the filler spring 1 and is soldered thereto as indicated at 6, the eyes or loops 4 projecting beyond the adjacent ends of the mesh fabric 2. The mesh fabric is of seamless formation and is snugly or tightly engaged over the filler spring 1 and has its ends 7 disposed in substantially abutting engagement with the eyes or loops 4. The mesh fabric may be soldered at its extreme ends to the connecting members as desired.

It will be understood that the mesh fabric, while flexible is not form-retaining, but by employment of a filler spring as above set forth, the mesh fabric is not only shaped but is also held in such shape and is restored to its normal or initial shape upon flexure, by virtue of the filler spring.

It will further be noted that the bracelet can be easily and quickly and economically produced, since it is merely necessary to attach the connecting members to the filler spring and then insert the latter in the mesh fabric, followed by soldering of the latter or bending of the ends 7 thereof over the ends of the filler spring, as may be preferred.

Having thus described my invention what I claim as new and desire to secure by Letters Patent is:—

1. In a watch bracelet, a filler composed of a coiled spring of substantially rectangular cross-section having its coils closely related, a connecting member for each of the ends of the filler centrally doubled upon itself to form an eye and having its ends abutting and secured within the interior of the spring, and a seamless mesh fabric covering for the spring of cross section conforming to that of the filler and having its ends abutting the respective eyes of the connecting member.

2. In a bracelet, a filler composed of a hollow coiled spring of substantially rectangular cross-section formed of a single piece of wire, independent connecting members for the ends of the filler each having a part thereof extending within and conforming to the spring interior and rigidly soldered thereto and a mesh fabric covering for the filler engaged with the sides and with the ends of the filler and having its ends soldered to the end portions of the filler whereby to rigidly connect the ends of the filler and the ends of the mesh fabric to said parts of the connecting members.

In testimony whereof I have signed my name to this specification.

FREDERICK W. NITTEL.